United States Patent
Waseda et al.

(10) Patent No.: US 6,474,875 B1
(45) Date of Patent: Nov. 5, 2002

(54) BEARING DEVICE (75) Inventors: Yoshitaka Waseda; Nobutsuna Motohashi, both of Tokyo (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/587,037

(22) Filed: Jun. 2, 2000

(30) Foreign Application Priority Data

Jun. 4, 1999 (JP) ............................................ 11-157844
May 24, 2000 (JP) ........................................ 2000-152583

(51) Int. Cl.⁷ ............................................. F16C 27/06
(52) U.S. Cl. ........................................ 384/582; 384/536
(58) Field of Search ................................. 384/536, 582

(56) References Cited

U.S. PATENT DOCUMENTS

| | | | |
|---|---|---|---|
| 2,173,250 A | * 9/1939 | Fay ............................. | 384/536 |
| 2,635,019 A | * 4/1953 | Cochran ...................... | 384/536 |
| 3,704,922 A | * 12/1972 | Kleinschmidt et al. ..... | 384/582 |
| 3,883,194 A | * 5/1975 | Pitner .......................... | 384/582 |
| 3,890,854 A | * 6/1975 | Pitner .................... | 384/582 X |
| 4,708,498 A | 11/1987 | Labedan et al. ............. | 384/560 |
| 4,820,062 A | 4/1989 | Shirane ....................... | 384/486 |
| 5,632,562 A | * 5/1997 | Kidzun et al. .............. | 384/536 |

FOREIGN PATENT DOCUMENTS

| | | | | |
|---|---|---|---|---|
| EP | 544144 | * 8/1993 | ................. | 384/582 |
| JP | 48-9446 | 3/1973 | | |

* cited by examiner

Primary Examiner—Thomas R. Hannon
(74) Attorney, Agent, or Firm—Jordan and Hamburg LLP (57) ABSTRACT

The bearing device 4 is press-fitted between the inside surface of the axis insertion hole of a steering column and the outside surface of a steering axis inserted into the axis insertion hole so as to support the steering axis. The bearing device 4 comprises a roller bearing arranged on the outside surface of the steering axis and a spacer ring arranged between the outside surface of the roller bearing and the inside surface of the axis insertion hole. The spacer ring comprises a wall thickness holding unit for holding the thickness of its wall in the radius direction and a thickness reduction unit which is provided on at least one site of the inside and outside surfaces and its end in the vicinity of the wall thickness holding unit and which reduces the thickness of the wall to facilitate deformation of the spacer ring.

10 Claims, 8 Drawing Sheets

FIG. 13 PRIOR ART

BEARING DEVICE

BACKGROUND OF THE INVENTION

1. Field of the invention

The present invention relates to a bearing device which is press-fitted between the inside surface of the axis insertion hole of a housing like a steering column and the outside surface of a steering axis or the like inserted into the axis insertion hole, so as to support the axis.

2. Description of the Related Art

The steering axis in an automobile steering mechanism is linked between a steering wheel and a universal joint, and supported by a roller bearing inside the axis insertion hole of the steering column.

While roller bearings are manufactured by bearing manufacturer's, steering axes and steering columns are manufactured by automobile makers.

The bearing manufacturers have a desire to use a roller bearing having the same specification as a steering axis which is supported by the roller bearing.

The steering axes have an approximately united outer diameter in each automobile maker; however, the steering columns have different inner diameters in each maker.

For this reason, the clearance in the radius direction between the outside surface of the steering axis and the inside surface of the axis insertion hole of the steering column is not fixed.

Therefore, in order to support the steering axis inside the axis insertion hole of the steering column by a roller bearing, a spacer ring is needed to adjust the clearance formed in the radial direction.

Figure 13:
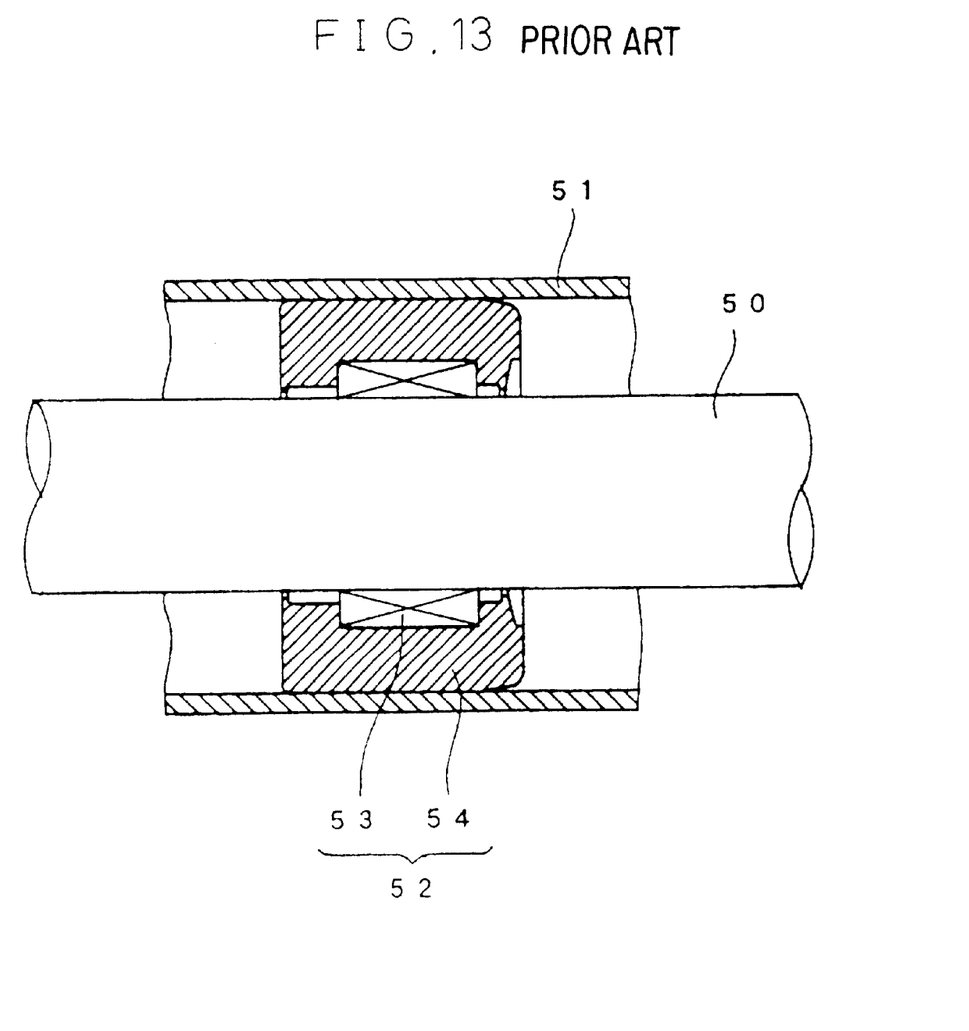
FIG. 13 is a diagram showing the configuration of the main part only of the car steering mechanism where a steering axis is linked between a steering wheel and a universal joint.

FIG. 13 shows the structure of the main part of the automobile steering mechanism where a steering axis is linked between a steering wheel and the universal joint.

The steering axis 50 is inserted into the axis insertion hole of a steering column 51. The steering axis 50 is supported in a rotatable manner by a bearing device 52 inside the axis insertion hole of the steering column 51.

The bearing device 52 is composed of a roller bearing 53 and a spacer ring 54 for adjusting the clearance in the radius direction. The spacer ring 54 is made from an elastic material like rubber in order to enhance the steering sense.

The spacer ring 54 is press-fitted into the clearance in the radius direction between the steering axis 50 and the steering column 51 by taking advantage of its elasticity. In this case, the larger the inner diameter of the axis insertion hole of the steering column 51 to increase the clearance in the radius direction, the thicker the wall of the spacer ring 54 becomes. The spacer ring 54 having a thick wall is a kind of stiffened member even if it is made from an elastic material like rubber.

Therefore, when the axis insertion hole of the steering column 51 has, for example, too small an inner diameter due to the variations during manufacturing, the spacer ring 54 stiffened with the thick wall makes it hard for the roller bearing 53 to be well incorporated into the spacer ring 54 by taking advantage of its elastic deformation. As a result, the efficiency of the assembly operation is badly affected, resulting in a rise in production cost.

Such a problem is not limited to automobiles having a steering column, but holds true in a bearing device which is press-fitted between the inside surface of the axis insertion hole of a housing or the like and the outside surface of an axis inserted into the axis insertion hole so as to support the axis, when there are variations in the inner diameter of the axis insertion hole during manufacturing, and a spacer ring made from an elastic material is used to support the axis.

SUMMARY OF THE INVENTION

Therefore, a main object of the present invention is to provide a bearing device which can be easily applied into the clearance formed in the radius direction between a housing and an axis even if there are variations in the inner diameter of the axis insertion hole of the housing.

Other objects, features and advantages of the present invention will be clarified in the following description.

In the present invention, a bearing device is incorporated into a mechanism comprising a housing having an axis insertion hole and an axis to be inserted into said axis insertion hole, and which supports said axis inside said housing, and the bearing device comprises a roller bearing arranged on an external circumference of said axis; and a spacer ringmade from an elastic material and arranged between an outside surface of said roller bearing and an inside surface of said axis insertion hole of said housing. The spacer ring comprises a wall thickness holding unit for holding thickness of a wall thereof in a radius direction; and a thickness reduction unit which is provided in a vicinity of said wall thickness holding unit and which reduces the thickness of the wall in the radius direction to facilitate deformation of said spacer ring.

Preferably, said spacer ring has a concavo-convex portion on an outside surface thereof in an axial direction, and said thickness reduction unit composed of said concavo-convex portion comprises an elastic deformation unit which deforms in accordance with an acting force applied in the radius direction from the inside surface of said axis insertion hole, depending on an inner diameter of said axis insertion hole.

Preferably, said housing has a holding hook which protrudes inwardly in the radius direction, and said thickness reduction unit is capable of being held by said holding hook.

Preferably, said spacer ring comprises a through hole formed in the axial direction and circular seals arranged on both ends of an internal wall thereof, and further comprises a roller bearing storage unit at a center in the axial direction, and said roller bearing is stored in said roller storage unit of said spacer ring.

BRIEF DESCRIPTION OF THE DRAWINGS

These and other objects as well as advantages of the invention will become clear by the following description of preferred embodiments of the invention with reference to the accompanying drawings, wherein.

DETAILED DESCRIPTION OF THE INVENTION

The bearing device in accordance with the preferred embodiment of the present invention will be detailed as follows with reference to FIG. 1 through FIG. 4.

These drawings include a steering wheel 1, a steering column 2 as a housing fixed to the body of a car, a steering axis 3 inserted into the axis insertion hole of the steering column 2 to transmit the steering of the steering wheel to the car wheel, and a bearing device 4 press-fitted at least two positions in the radius direction in the clearance formed between the inside surface of the axis insertion hole of the steering column 2 and the outside surface of the steering axis 3.

Figure 1:
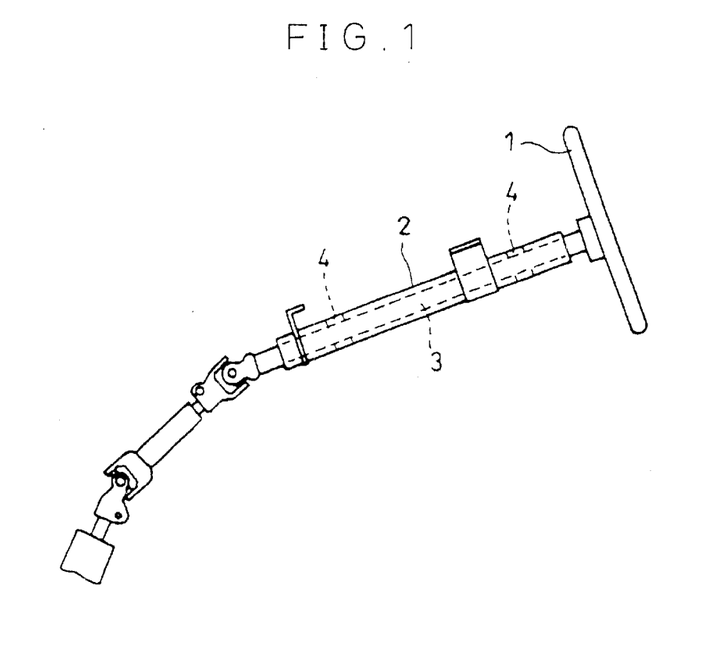
FIG. 1 is a diagram showing the rough configuration of the car steering mechanism to which the bearing device of the present invention is applied.
Figure 2:
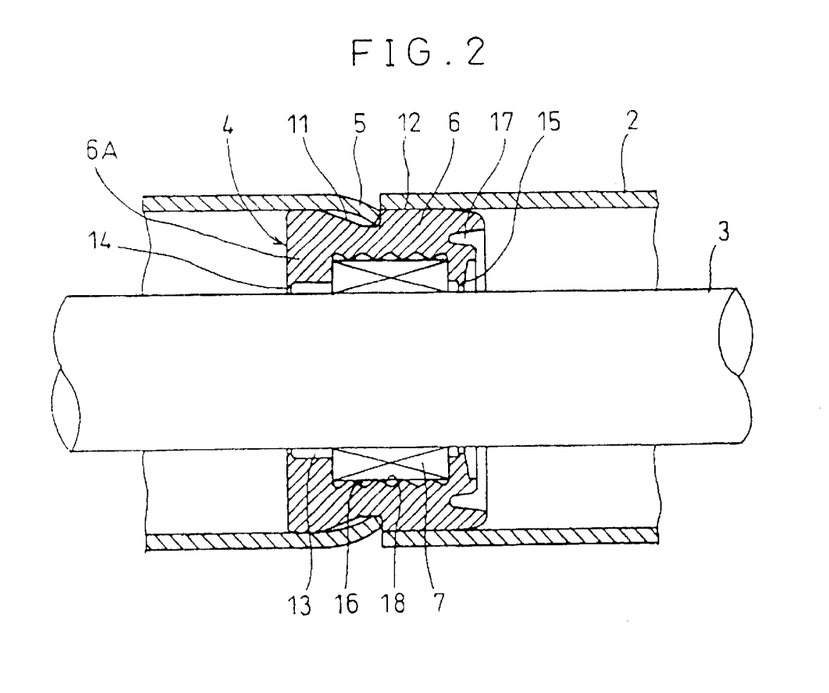
FIG. 2 is an enlarged side view of the main part of FIG. 1.
Figure 3:
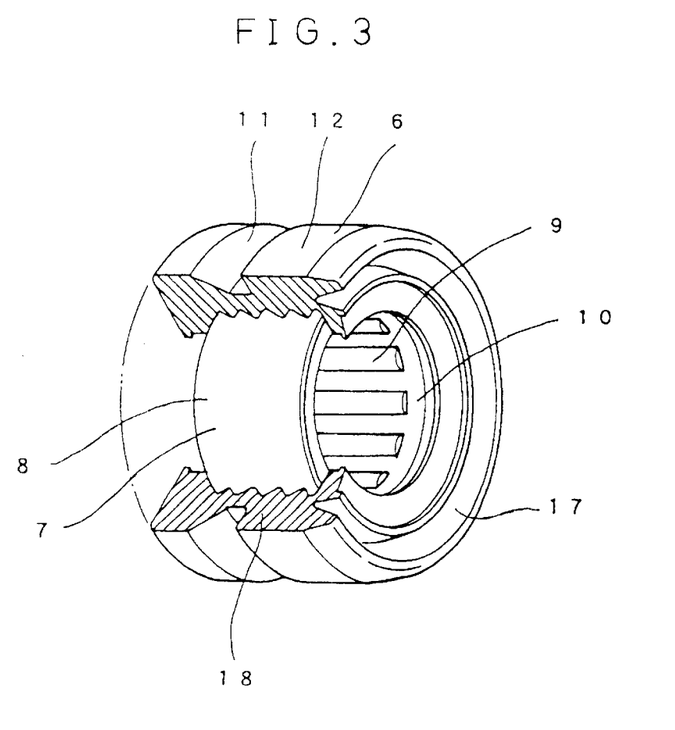
FIG. 3 is a cutaway perspective view of a spacer ring and a roller bearing which compose the bearing device shown in FIG. 1.

The bearing device 4 is held by a holding hook 5 formed inside the axis insertion hole of the steering column 2, and is provided with a circular spacer ring 6 and an acicular needle roller bearing 7.

The roller bearing 7 comprises an outer ring 8, a plurality of acicular rollers 9 and a holder 10 to hold them. The roller bearing 7 is represented in an abbreviated symbol in the drawings other than FIG. 3.

The spacer ring 6 is made from rubber or an elastic resin. The ring 6 has a main body arranged approximately at the center in the radial direction of the entire thickness, and further has a concave portion 11 formed in the circumferential direction on the outside surface of the main body. The concave portion 11 can be held by the holding hook 5 projecting inwardly in the radius direction of the steering column 2.

In this case, when the concave portion 11 is continuous in the circumferential direction, there is no directivity to hold the concave portion 11 of the spacer ring 6 composing the outside surface of the bearing device 4 by the holding hook 5. When the concave portion 11 is discontinuous in the circumferential direction, directivity is required to hold the portion 11 by the holding hook 5. Therefore, it is possible to form an appropriate positioning mark for indicating the position at the surface end of the spacer ring 6 to hold the concave portion 11 by the holding hook 5.

With the concave portion 11 in the axial direction, the spacer ring 6 has a concavo-convex portion 12 in the axial direction on its entire outside surface. The concavo-convex portion 12 becomes an elastic deformation unit which deforms in accordance with the acting force applied in the radius direction from the inside surface of the axis insertion hole, depending on the inner diameter of the hole.

Although the concavo-convex portion 12 is formed by providing only the single concave portion 11 in the axial direction, the portion 12 can be formed in the axial direction by providing more than one concave portion.

The spacer ring 6 has a through hole 13 formed in the axial direction and non contact type circular seals 14 and 15 formed at both ends of the inside wall of the through hole 13. The spacer ring 6 further has a roller bearing storage unit 16 formed at the center of the through hole 13 in the axial direction.

The spacer ring 6 also has a circular groove 17 at the end on the side from which the steering axis 3 is inserted into the steering column 2, so as to make the ring 6-deform easily in the radius direction. Instead of being continuous in the circumferential direction, the groove 17 may be formed discontinuously in the circumferential direction. The circumferential groove 17 can have any depth in the axial direction and any shape including its groove width, and some specific modified examples will be described below.

Since the spacer ring 6 is easily deformed by the force applied onto the circumferential groove 17 in the radius direction from the holding hook 5, the bearing device 4 can be easily inserted into the axis insertion hole of the steering column 2 even if the spacer ring 6 is thick in the radius direction.

On the inside surface of the roller bearing storage unit 16 of the spacer ring 6, a concavo-convex portion 18 is formed in the axial direction. The portion 18 becomes an elastic deformation unit which deforms in accordance with the acting force applied in the radius direction from the inside surface of the axis insertion hole, depending on the inner diameter of the hole. The height, interval, number, shape and other conditions of the concavo-convex portion 18 can be set appropriately depending on the design.

Although the concavo-convex portion 18 is formed integrally with the spacer ring 6, it is possible that the spacer ring 6 is composed of the main body only without the concavo-convex portion 18, and that an elastic deformation unit with the concavo-convex portion 18 formed apart from the main body is combined with the main body by bonding each other.

When the elastic deformation unit is formed separately, its elasticity can be adjusted to an appropriate degree of deformation different from the main body.

The spacer ring 6 has a wall thickness holding unit 6A for holding the wall thickness in the radius direction, and the concavo-convex portion 12, circumferential groove 17 and concavo-convex portion 18 are formed on the inside and outside surfaces in the vicinity of the wall thickness holding unit 6A and at the end of the surface, thereby composing a thickness reduction unit to facilitate the deformation of the spacer ring 6 by reducing the wall thickness.

In other words, the concavo-convex portion 12 composes as a thickness reduction unit a concavo-convex portion in the axial direction formed on the outside surface of the spacer ring 6, the circumferential groove 17 composes as a thickness reduction unit a groove in the axial direction formed at the surface end in the direction to insert the steering axis 3 into the axis insertion hole of the spacer ring 6, and the concavo-convex portion 18 composes as a thickness reduction unit a groove in the circumferential direction formed on the inside surface of the storage unit 16 of the roller bearing 7 of the spacer ring 6, respectively. These thickness reduction units can be formed at least in one side of the wall thickness holding unit 6A.

The action of the concavo-convex portion 18 will be described with reference to FIG. 4.

Figure 4A:
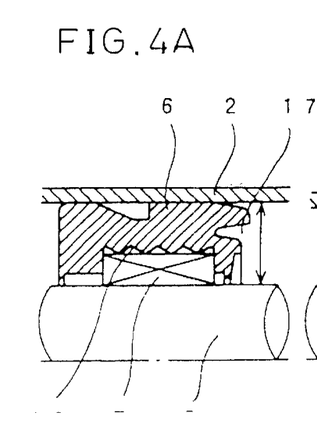
FIG. 4A is a cutaway view used to explain the action of the concavo-convex portion on the inside surface of the roller bearing storage unit of the spacer ring, showing the case where the inner diameter of the axis insertion hole of the steering column is medium-sized, concerning the deformation condition of the concavo-convex portion.
Figure 4B:
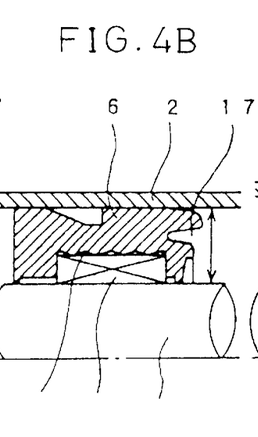
FIG. 4B corresponds to FIG. 4A, and shows the case where the inner diameter of the axis insertion hole of the steering column is small, concerning the deformation condition of the concavo-convex portion.
Figure 4C:
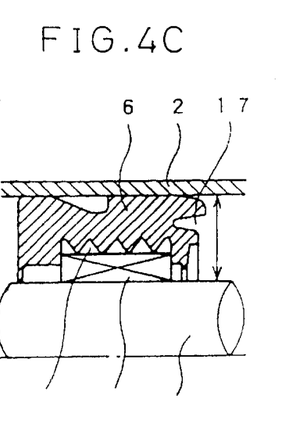
FIG. 4C corresponds to FIG. 4A, and shows the case where the inner diameter of the axis insertion hole of the steering column is large, concerning the deformation condition of the concavo-convex portion.

FIG. 4A shows the deformation condition of the concavo-convex portion 18 in the case where the inner diameter R2 of the axis insertion hole of the steering column 2 is medium-sized, FIG. 4B shows the condition in the case where the inner diameter R2 of the axis insertion hole of the steering column 2 is small and FIG. 4C shows the condition in the case where the inner diameter R2 of the axis insertion hole of the steering column 2 is large. It should be noted that the illustration of the holding hook 5 inside the axis insertion hole of the steering column 2 is omitted.

When the inner diameter R2 of the axis insertion hole of the steering column 2 is medium-sized as shown in FIG. 4A, the acting force in the axial direction applied from the inside surface of the axis insertion hole is medium-sized, so that the degree of deformation of the concavo-convex portion 18 is medium-sized. When the inner diameter R2 of the axis insertion hole of the steering column 2 is small as shown in FIG. 4B, the acting force in the axial direction applied from the inside surface of the axis insertion hole is large, so that the degree of deformation of the concavo-convex portion 18 is large. When the inner diameter R2 of the axis insertion hole of the steering column 2 is large as shown in FIG. 4C, the force in the axial direction applied from the inside surface of the axis insertion hole is small, so that the degree of deformation of the concavo-convex portion 18 is small.

As shown in FIG. 4, whatever the inner diameter of the axis insertion hole is, the concavo-convex portion 18 on the inside surface of the roller bearing storage unit 17 of the spacer ring 6 expands and contracts in the radius direction according to the acting force. This facilitates the insertion of the roller bearing 7 into the storage unit 16 even if the wall of the spacer ring 6 is thick and stiffened due to a large clearance in the radius direction between the inside surface of the axis insertion hole of the steering column 2 and the outside surface of the roller bearing 7, and also facilitates the application of the bearing device 4 into the axis insertion hole of the steering column 2.

The inventors of the present invention conducted an experiment to compare the pressure-fitting force when the roller bearing 7 of a conventional bearing device provided with the spacer ring shown in FIG. 13 and of the bearing device 4 of the present invention provided with the spacer ring 6 shown in FIG. 1 through FIG. 4 are applied into their respective storage units 16. (In the experiment, these devices have the same size although the details are not shown to simplify the description.)

As a result, the pressure-fitting force of a first prior art device is 42 kgf, while the device of the present invention corresponding to the first prior art device is 28 kgf. A second prior art device is 40 kgf, while the device of the present invention corresponding to the second prior art device is 20 kgf. Thus, concerning the pressure-fitting force of the roller bearing 7 against the storage unit 16, the device of the present invention corresponding to the first prior art device is only 0.67 times, and the device of the present invention corresponding to the second prior art device is only 0.5 times, which shows remarkable improvement in the application of the roller bearing 7 into the storage unit 16.

The spacer ring 6 can be variously modified as will be described with reference to FIG. 5 to FIG. 10.

Figure 5A:
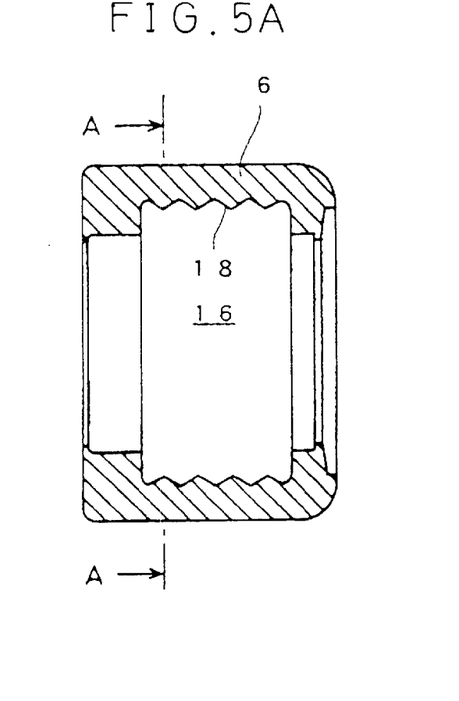
FIG. 5A is a modified example of the spacer ring, showing a side cross sectional view of the spacer ring.
Figure 5B:
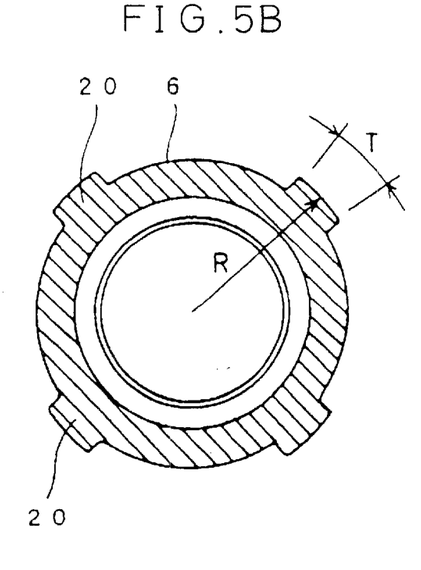
FIG. 5B is a cross sectional view taken along the line A—A of FIG. 5A when the ridge portions have a small length in the circumferential direction.
Figure 5C:
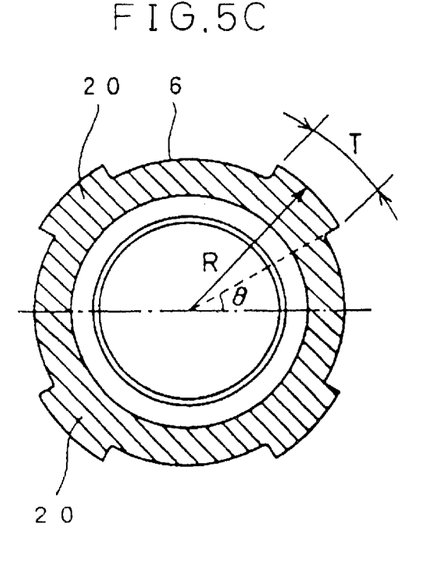
FIG. 5C is a cross sectional view taken along the line A—A of FIG. 5A when the ridge portions have a large length in the circumferential direction.

The spacer ring 6 shown in FIG. 5 has a plurality of ridge portions 20 in the axial direction on the outside surface. There are four ridge portions 20 in this example. The ridge portions 20 are arranged at regular intervals to each other in the circumferential direction. FIG. 5A is a side cross sectional view of the spacer ring 6, and FIGS. 5B and 5C are cross sectional views taken along the line A—A shown in FIG. 5A. FIG. 5B shows the case where the ridge portions 20 are short in the circumferential direction, while FIG. 5C shows the case where the ridge portions 20 are long in the circumferential direction.

In either case of FIGS. 5B and 5C, it is preferable that the following formulas ① and ② hold as the shape of the outside surface of the spacer ring 6. In the formulas, R represents the radius from the center of the spacer ring 6 to the external circumference of the ridge portions 20, N represents the number of the ridge portions 20 and T represents the length of the ridge portions 20 in the circumferential direction.

$$0 < T < (2\pi R/N) \quad \text{①}$$

$$0 < N < 20 \quad \text{②}$$

It should be noted that the case of FIG. 5C is on condition that when half of the angle formed between adjacent ends of adjacent ridge portions 20 in the circumferential direction is θ, the following formula ③ holds:

$$0 \; 21 \; \theta < (360/N) \quad \text{③}$$

Figure 6A:
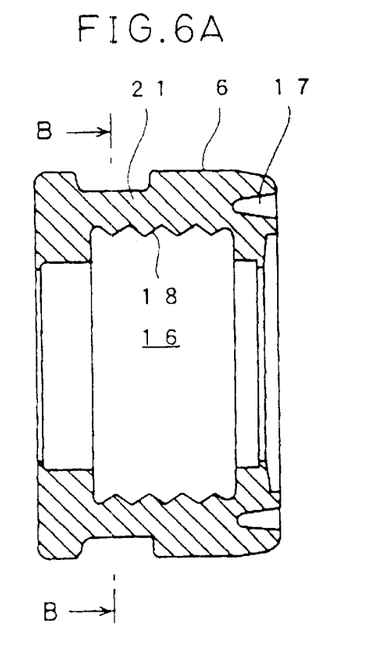
FIG. 6A is a side cross sectional view showing another modified example of the spacer ring.
Figure 6B:
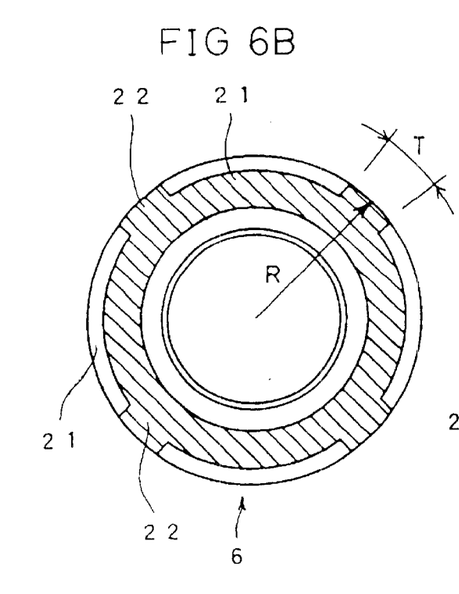
FIG. 6B is a cross sectional view taken along the line B—B of FIG. 6A when the ridge portions have a small length in the circumferential direction.
Figure 6C:
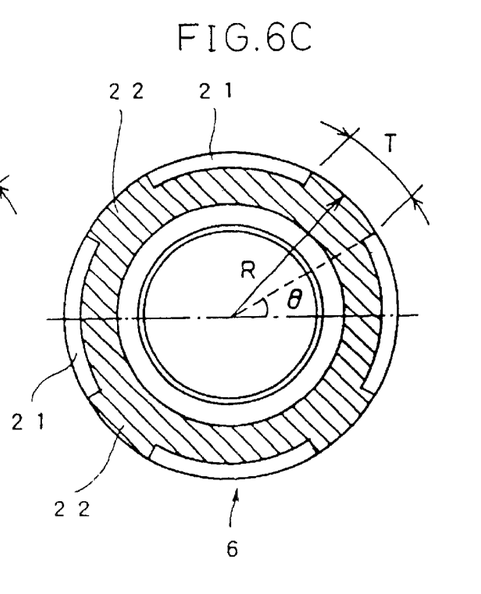
FIG. 6C is a cross sectional view taken along the line B—B of FIG. 6A when the ridge portions have a large length in the circumferential direction.

The spacer ring 6 shown in FIG. 6 has plural (four in this example) concave portions 21 on the outside surface in the circumferential direction, so that plural ridge portions 22 (four in this example) are formed in the circumferential direction between adjacent concave portions 21. FIG. 6A is a side cross sectional view of the spacer ring 6, and FIGS. 6B and 6C are cross sectional views taken along the line B—B of FIG. 6A. FIGS. 6B shows the case where the ridge portions 22 are short in the circumferential direction and FIG. 6C shows the case where the ridge portions 22 are long in the circumferential direction.

In either case of FIGS. 6B and 6C, as the shape of the outside surface of the spacer ring, it is preferable that the above-mentioned formulas ① and ② hold in the same manner as FIG. 5. It should be noted that the case of FIG. 6C is on condition that the formula ③ holds.

Figure 7:
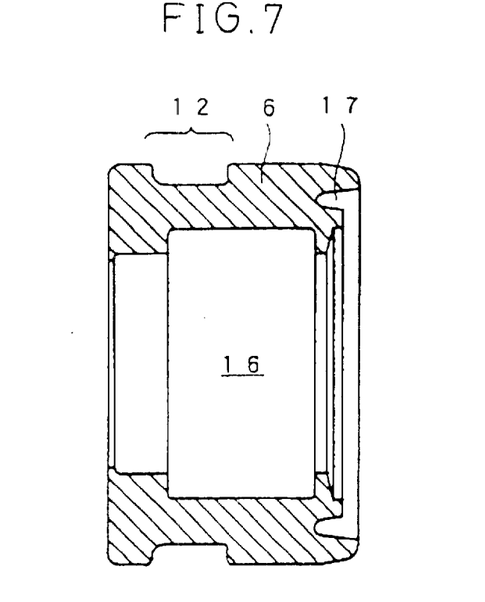
FIG. 7 is a side cross sectional view showing further another modified example of the spacer ring.

The spacer ring 6 shown in FIG. 7 does not have the concavo-convex portion 18 on the inside surface of the roller bearing storage unit 16. When the spacer ring 6 is thick-walled and stiffened due to the large clearance between the inside surface of the axis insertion hole of the steering column 2 and the outside surface of the roller bearing 7 in the radial direction, the concavo-convex portion 12 formed on the outside surface facilitates the application of the bearing device 4 into the axis insertion hole of the steering column 2.

Figure 8:
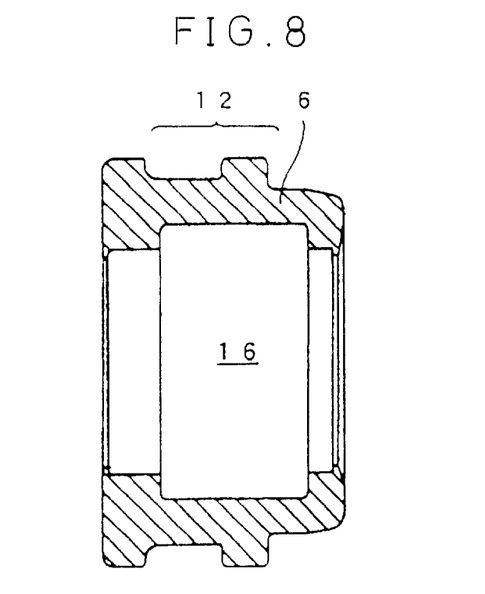
FIG. 8 is a side cross sectional view showing further another modified example of the spacer ring.

The spacer ring 6 shown in FIG. 8 does not have the concavo-convex portion 18 on the inside surface of the roller bearing storage unit 16. When the spacer ring 6 is thick-walled and stiffened due to the large clearance between the inside surface of the axis insertion hole of the steering column 2 and the outside surface of the roller bearing 7 in the radial direction, the concavo-convex portion 12 formed on the outside surface facilitates the insertion of the roller bearing 7 into the storage unit 16, and also facilitates the application of the bearing device 4 into the axis insertion hole of the steering column 2.

Figure 9:
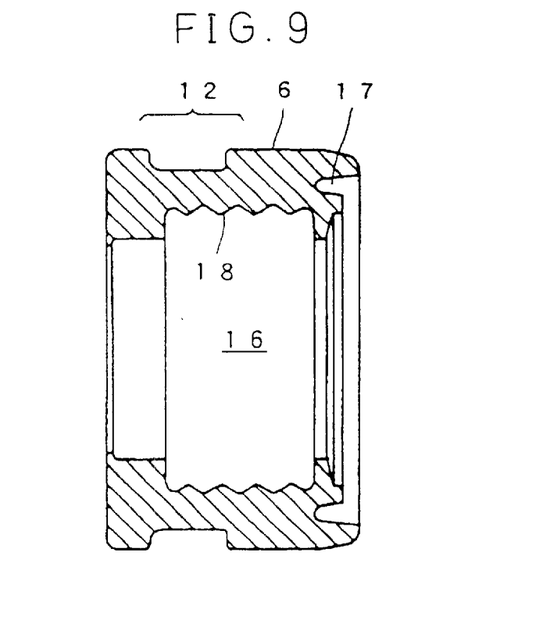
FIG. 9 is a side cross sectional view showing further another modified example of the spacer ring.

The spacer ring 6 shown in FIG. 9 slightly protrudes on the right side in the axial direction, which facilitates the insertion of the roller bearing 7 into the storage unit 16, and also improves the elasticity of the circumferential groove 17 in the radius direction when it is press-fitted into the axis insertion hole of the steering column 2.

Figure 10:
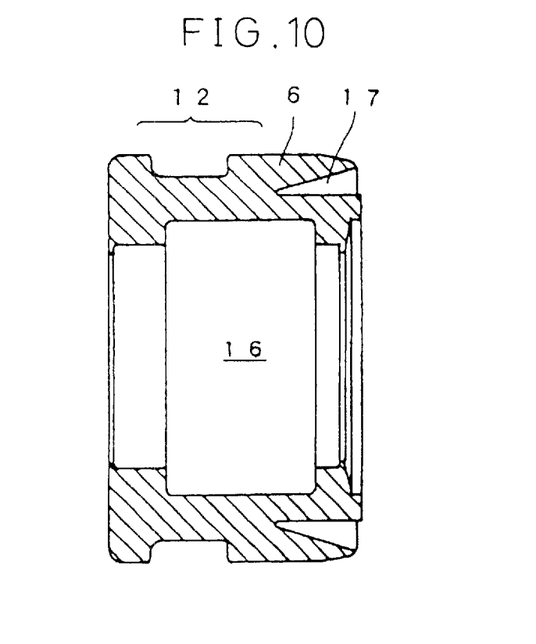
FIG. 10 is a side cross sectional view showing further another modified example of the spacer ring.

In the spacer ring 6 shown in FIG. 10, the circumferential groove 17 reaches inside the circumferential wall facing the roller bearing storage unit 16 so as to increase the opening diameter of the groove 17 in the radius direction. As a result, the insertion of the roller bearing 7 into the storage unit 16 is facilitated, and the elasticity of the circumferential groove 17 in the radius direction is improved when it is press-fitted into the axis insertion hole of the steering column 2.

Figure 11:
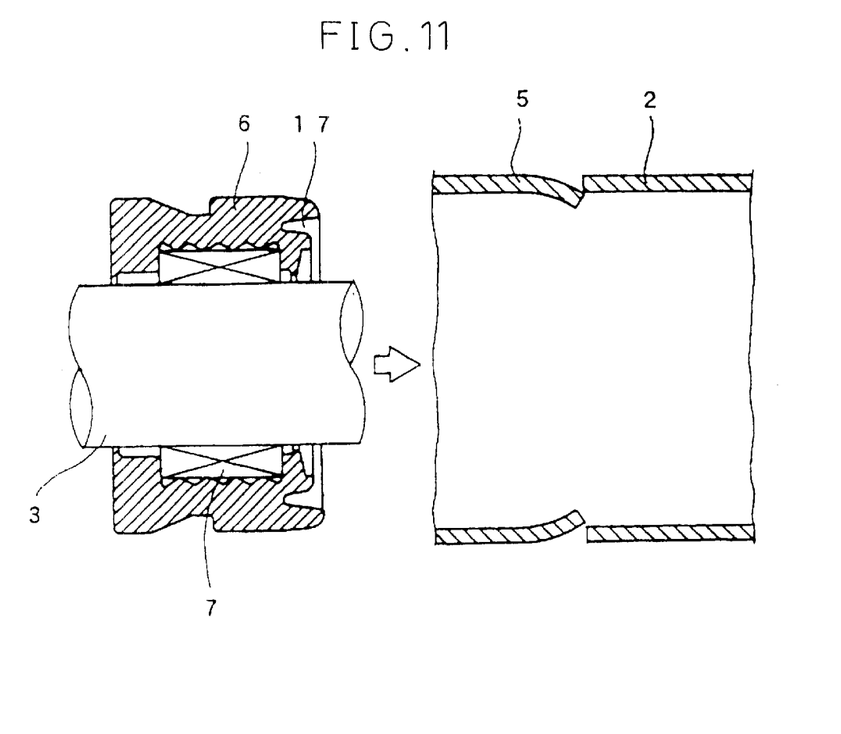
FIG. 11 is a diagram showing the condition before the bearing device is applied into the axis insertion hole of the steering column.

The condition before the bearing device 4 is applied into the axis insertion hole of the steering column 2 is shown in FIG. 11. The bearing device 4 in the condition of FIG. 11 is applied as shown in FIG. 2.

Figure 12:
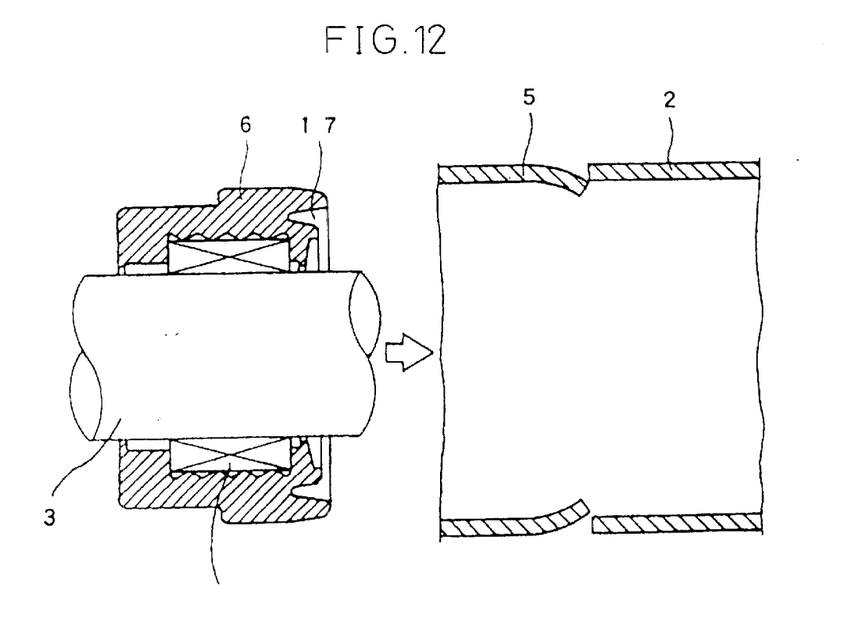
FIG. 12 is a diagram showing the condition before the bearing device is applied into the axis insertion hole of the steering column.

FIG. 12 shows the condition before the bearing device 4 is applied into the axis insertion hole of the steering column 2 in correspondence with FIG. 11 except that the spacer ring 6 is different.

The spacer ring 6 can be made from rubber material like nitrile rubber (NBR). In this case, the hardness of the spring can be in the range Hs 70 to 90. When the rubber material is below Hs 70, the spring may become too soft to have sufficient stiffness, while when it is over Hs 90, the high stiffness may make the application to the bearing device 4 difficult. In the above mentioned range, a preferable range is Hs 70 to 80, and a more preferable range is Hs 70 to 75.

The present invention is not limited to automobiles having a steering column, but holds true in the following bearing device. In a housing mechanism comprising a housing with an axis insertion hole and an axis to be inserted into the hole of said housing, when the bearing device is press-fitted between the inside surface of the hole of the housing and the outside surface of the axis inserted into the hole so as to support the axis, if there are variations in the inner diameter of the axis insertion hole during manufacturing, a spacer ring made from an elastic material is used to support the axis.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A bearing device which is incorporated into a mechanism comprising a housing having an axis insertion hole and an axis to be inserted into said axis insertion hole of said housing, and which supports said axis inside said housing, said bearing device comprising:
    a roller bearing arranged on an external circumference of said axis; and
    a spacer ring made from an elastic material and arranged between an outside surface of said roller bearing and an inside surface of said axis insertion hole of said housing,
    said spacer ring comprising:
        a wall thickness holding unit for holding thickness of a wall thereof in a radius direction; and
        a thickness reduction unit which is provided in a vicinity of said wall thickness holding unit and which reduces the thickness of the wall in the radius direction to facilitate deformation of said spacer ring, said housing having a holding hook which protrudes inwardly in the radius direction, said thickness reduction unit being capable of being held by said holding hook.

2. A bearing device which is incorporated into a mechanism comprising a housing having an axis insertion hole and an axis to be inserted into said axis insertion hole of said housing, and which supports said axis inside said housing, said bearing device comprising:
    a roller bearing arranged on an external circumference of said axis; and
    a spacer ring made from an elastic material and arranged between an outside surface of said roller bearing and an inside surface of said axis insertion hole of said housing,
    said spacer ring comprising:
        a wall thickness holding unit for holding thickness of a wall thereof in a radius direction; and
        a thickness reduction unit which is provided in a vicinity of said wall thickness holding unit and which reduces the thickness of the wall in the radius direction to facilitate deformation of said spacer ring, wherein:
            said spacer ring has a concavo-convex portion in an axial direction on an outside surface thereof and an axial direction groove at an end thereof in the direction to insert said axis into said axis insertion hole;
            said thickness reduction unit has said concavo-convex portion and said axial direction groove;
            said housing has a holding hook protruding inwardly in the radius direction; and
            said concavo-convex portion of said thickness reduction unit is capable of being held by said holding hook, and said axial direction groove of said thickness reduction unit is capable of being deformed by a force applied by said holding hook in the radius direction.

3. A bearing device which is incorporated into a mechanism comprising a housing having an axis insertion hole and an axis to be inserted into said axis insertion hole of said housing, and which supports said axis inside said housing, said bearing device comprising:
    a roller bearing arranged on an external circumference of said axis; and
    a spacer ring made from an elastic material and arranged between an outside surface of said roller bearing and an inside surface of said axis insertion hole of said housing,
    said spacer ring comprising:
        a wall thickness holding unit for holding thickness of a wall thereof in a radius direction; and a thickness reduction unit which is provided in a vicinity of said wall thickness holding unit and which reduces the thickness of the wall in the radius direction to facilitate deformation of said spacer ring, wherein:

said spacer ring has a through hole formed in an axial direction and circular seals arranged on both ends of an internal wall of said through hole, and further comprises a roller bearing storage unit at a center in the axial direction, and a concavo-convex portion in an axial direction is formed on the inside surface of said roller bearing storage unit;

said roller bearing is stored in said roller storage unit of said spacer ring; and said thickness reduction unit comprises an elastic deformation unit which is composed of said concavo-convex portion in the axial direction of said roller bearing storage unit, and which deforms in accordance with an acting force applied in the radius direction from the inside surface of said axis insertion hole, depending on an inner diameter of said axis insertion hole.

4. A bearing device which is incorporated into a mechanism comprising a housing having an axis insertion hole and an axis to be inserted into said axis insertion hole of said housing, and which supports said axis inside said housing, said bearing device comprising:

a roller bearing arranged on an external circumference of said axis; and a spacer ring made from an elastic material and arranged between an outside surface of said roller bearing and an inside surface of said axis insertion hole of said housing, said spacer ring comprising:

a wall thickness holding unit for holding thickness of a wall thereof in a radius direction; and a thickness reduction unit which is provided in a vicinity of said wall thickness holding unit and which reduces the thickness of the wall in the radius direction to facilitate deformation of said spacer ring, wherein:

said spacer ring includes a through hole formed in an axial direction and non-contact type circular seals arranged at both ends of an internal wall of said through hole, and further comprises a roller bearing storage unit at a center in the axial direction and a circumferential groove in the axial direction at an end thereof in the direction of insertion of said axis into said axis insertion hole;

said roller bearing is stored in said roller bearing storage unit of said spacer ring; and said thickness reduction unit is composed of the circumferential groove in the axial direction of said spacer ring and the circumferential groove extends inside the circumference wall facing said roller bearing storage unit so as to increase its opening diameter in the radius direction.

5. A bearing device incorporated into an automobile steering mechanism comprising a steering column having an axis insertion hole and a steering axis which is inserted into said axis insertion hole and which is linked between a steering wheel and a universal joint so as to support said steering axis inside said axis insertion hole, said bearing device comprising:

a roller bearing arranged on an outside surface of said steering axis; and a spacer ring which is elastic and arranged between an outside surface of said roller bearing and an inside surface of said axis insertion hole of said steering column, said spacer ring comprising:

a wall thickness holding unit for holding thickness of a wall thereof in the radius direction; and a thickness reduction unit which is provided in a vicinity of said wall thickness holding unit and which reduces the thickness of the wall in the radius direction to facilitate deformation of said spacer ring, wherein:

said spacer ring comprises a concavo-convex portion in an axial direction on an outside surface thereof and an axial direction groove at an end thereof in the direction of insertion of said axis into said axis insertion hole of said housing, further comprises a through hole formed in the axial direction and circular seals arranged at both ends on an internal wall of said through hole, and further comprises a roller bearing storage unit which is arranged at a center in the axial direction and which is provided with a concavo-convex portion in the axial direction on an inside surface thereof;

said roller bearing is stored in said roller bearing storage unit of said spacer ring; and said thickness reduction unit is composed of the concavo-convex portion in the axial direction of said spacer ring, said axial direction groove and said concavo-convex portion in the axial direction of said roller bearing storage unit.

6. A bearing device which is incorporated into a mechanism comprising a housing having an axis insertion hole and an axis to be inserted into said axis insertion hole of said housing, and which supports said axis inside said housing, said bearing device comprising:

a roller bearing arranged on an external circumference of said axis; and a spacer ring made from an elastic material and arranged between an outside surface of said roller bearing and an inside surface of said axis insertion hole of said housing, said spacer ring including a wall thickness holding unit for holding thickness of a wall thereof in a radial direction, said spacer ring further including a concavo-convex portion comprised of alternately formed concave portions and convex portions in an axial direction on an outside surface near said thickness holding unit, said concavo-convex portion comprising an elastic deformation unit which deforms in accordance with an acting force applied in the radial direction from the inside surface of said axis insertion hole depending on an inner diameter of said axis insertion hole of said housing, said housing having a holding hook which protrudes inwardly in the radial direction, said concave portion of said concavo-convex portion being capable of being held by said holding hook.

7. A bearing device which is incorporated into a mechanism comprising a housing having an axis insertion hole and an axis to be inserted into said axis insertion hole of said housing, and which supports said axis inside said housing, said bearing device comprising:

a roller bearing arranged on an external circumference of said axis; and a spacer ring made from an elastic material and arranged between an outside surface of said roller bearing and an inside surface of said axis insertion hole of said housing, said spacer ring including a wall thickness holding unit for holding thickness of a wall thereof in a radial direction and a concavo-convex portion comprised of alternately formed concave portions and convex portions on an outside surface thereof in an axial direction, said spacer ring further including a circumfential groove at an end thereof on a side from which the axis is inserted into the axis insertion hole, said concavo-convex portion comprising an elastic deformation unit which deforms in accordance with an acting force applied in the radial direction from the inside surface of said axis insertion hole depending on an inner diameter of said axis insertion hole of said housing, said housing having a holding hook protruding inwardly in the radial direction, said concavo-convex portion of said thickness reduction unit being capable of being held by said holding hook, and said circumfential groove being capable of being deformed by a force applied by said holding hook in the radial direction.

8. A bearing device which is incorporated into a mechanism comprising a housing having an axis insertion hole and an axis to be inserted into said axis insertion hole of said housing, and which supports said axis inside said housing, said bearing device comprising:

a roller bearing arranged on an external circumference of said axis; and a spacer ring made from an elastic material and arranged between an outside surface of said roller bearing and an inside surface of said axis insertion hole of said housing, said spacer ring including a wall thickness holding unit for holding thickness of a wall thereof in a radial direction and a through hole formed in an axial direction, said spacer ring further including circular seals arranged on both ends of an internal wall of said through hole and a roller bearing storage unit at a central position of said spacer ring in the axial direction, said spacer ring further including a concavo-convex portion comprised of alternately arranged concave portions and convex portions formed on an inside surface of said roller bearing storage unit in the axial direction, said roller bearing being stored in said roller storage unit of said spacer ring, said concavo-convex portion comprising an elastic deformation unit which deforms in accordance with an acting force applied in the radial direction from the inside surface of said axis insertion hole depending on an inner diameter of said axis insertion hole in said housing.

9. A bearing device which is incorporated into a mechanism comprising a housing having an axis insertion hole and an axis to be inserted into said axis insertion hole of said housing, and which supports said axis inside said housing, said bearing device comprising:

a roller bearing arranged on an external circumference of said axis; and a spacer ring made from an elastic material and arranged between an outside surface of said roller bearing and an inside surface of said axis insertion hole of said housing, said spacer ring including a wall thickness holding unit for holding thickness of a wall thereof in a radial direction and a through hole formed in an axial direction, said spacer ring further including non contact type circular seals arranged on both ends of an internal wall of said through hole and a roller bearing storage unit at a central position of said spacer ring in the axial direction, said spacer ring further including a circumfential groove at an end thereof on a side from which the axis is inserted into the axis insertion hole, said roller bearing being stored in said roller storage unit of said spacer ring, said circumferential groove extending inside a circumference wall facing said roller bearing storage unit up to an opposing circumferential wall so as to increase an opening diameter in the radial direction.

10. A bearing device incorporated into an automobile steering mechanism comprising a steering column having an axis insertion hole and a steering axis which is inserted into said axis insertion hole and which is linked between a steering wheel and a universal joint so as to support said steering axis inside said axis insertion hole, said bearing device comprising:

a roller bearing arranged on an outside surface of said steering axis; and a spacer ring which is elastic and arranged between an outside surface of said roller bearing and an inside surface of said axis insertion hole of said steering column, said spacer ring including a wall thickness holding unit for holding thickness of a wall thereof in the radial direction and a first concavo-convex portion comprised of alternately formed concave portions and convex portions in an axial direction in a vicinity of said wall thickness holding unit, said spacer ring further including a circumfential groove at an end thereof on a side from which the steering axis is inserted into the axis insertion hole and a through hole formed in an axial direction, said spacer ring further including circular seals arranged on both ends of an internal wall of said through hole and a roller bearing storage unit at a central position of said spacer ring in the axial direction, said spacer ring further including a second concavo-convex portion comprised of alternately formed concave portions and convex portions in an axial direction formed on an inside surface of said roller bearing storage unit, said roller bearing being stored in said roller storage unit of said spacer ring, said first and second concavo-convex portions, along with said circumferential groove, reducing a thickness of said spacer ring in the radial direction and facilitating deformation of said spacer ring.

* * * * *